(12) United States Patent
Ray et al.

(10) Patent No.: US 11,094,208 B2
(45) Date of Patent: Aug. 17, 2021

(54) STEREO CAMERA SYSTEM FOR COLLISION AVOIDANCE DURING AIRCRAFT SURFACE OPERATIONS

(71) Applicant: The Boeing Company, Chicago, IL (US)

(72) Inventors: Gary Alan Ray, Issaquah, WA (US); Brian David Gilbert, Kenmore, WA (US)

(73) Assignee: The Boeing Company, Chicago, IL (US)

( * ) Notice: Subject to any disclaimer, the term of this patent is extended or adjusted under 35 U.S.C. 154(b) by 885 days.

(21) Appl. No.: 15/281,189

(22) Filed: Sep. 30, 2016

(65) Prior Publication Data

US 2018/0096610 A1   Apr. 5, 2018

(51) Int. Cl.
| | | |
|---|---|---|
| *G08G 5/04* | (2006.01) | |
| *G06K 9/00* | (2006.01) | |
| *G06T 7/73* | (2017.01) | |
| *G06T 7/292* | (2017.01) | |
| *G06T 7/579* | (2017.01) | |

(Continued)

(52) U.S. Cl.
CPC ............ *G08G 5/04* (2013.01); *B64D 45/00* (2013.01); *G06K 9/0063* (2013.01); *G06K 9/00744* (2013.01); *G06K 9/00805* (2013.01); *G06K 9/6212* (2013.01); *G06T 7/11* (2017.01); *G06T 7/174* (2017.01); *G06T 7/292* (2017.01); *G06T 7/579* (2017.01); *G06T 7/74* (2017.01); *G08G 5/0021* (2013.01); *G08G 5/045* (2013.01); *G08G 5/065* (2013.01); *H04N 7/181* (2013.01); *H04N 7/188* (2013.01); *H04N 13/239* (2018.05); *H04N 13/246* (2018.05);

(Continued)

(58) Field of Classification Search
None
See application file for complete search history.

(56) References Cited

U.S. PATENT DOCUMENTS

| | | |
|---|---|---|
| 5,629,692 A | 5/1997 | Stayton et al. |
| 5,821,943 A | 10/1998 | Shashua |

(Continued)

OTHER PUBLICATIONS

Richards, "Structure from stereo and motion," J. Opt. Soc. America A, vol. 2, Feb. 1985, pp. 343-349.

(Continued)

*Primary Examiner* — Frederick D Bailey
(74) *Attorney, Agent, or Firm* — Ostrager Chong Flaherty & Broitman P.C.

(57) ABSTRACT

A collision avoidance system comprises a pair of video cameras mounted to a vertical stabilizer of the aircraft, a machine vision processing unit, and a system to inform the pilots of a potential collision. The machine vision processing unit is configured to process image data captured by the video cameras using stereoscopic and structure from motion techniques to detect an obstacle that is near or in the path of the aircraft. Estimates of the range to the object and the rate of change of that range are computed. With the range and range rate, a time to collision can be estimated toward every point of the aircraft. A pilot warning can be sounded based on the nearness of the potential collision. A method of calibrating the video cameras using existing feature points on the top of the aircraft is initiated in response to power being turned on.

20 Claims, 7 Drawing Sheets

(51) Int. Cl.
*H04N 7/18* (2006.01)
*G06T 7/11* (2017.01)
*G06T 7/174* (2017.01)
*G06K 9/62* (2006.01)
*B64D 45/00* (2006.01)
*H04N 13/239* (2018.01)
*G08G 5/06* (2006.01)
*G08G 5/00* (2006.01)
*H04N 13/246* (2018.01)
*H04N 13/00* (2018.01)

(52) U.S. Cl.
CPC .............. *G06T 2207/10021* (2013.01); *G06T 2207/10032* (2013.01); *H04N 2013/0085* (2013.01)

(56) References Cited

U.S. PATENT DOCUMENTS

| | | | |
|---|---|---|---|
| 6,264,135 B1* | 7/2001 | Dacosta | B64D 47/08 244/1 R |
| 6,405,975 B1 | 6/2002 | Sankrithi et al. | |
| 6,928,363 B2 | 8/2005 | Sankrithi | |
| 7,024,309 B2 | 4/2006 | Doane | |
| 7,321,813 B2 | 1/2008 | Meunier | |
| 8,350,894 B2 | 1/2013 | Turner et al. | |
| 8,755,634 B2 | 6/2014 | Takahashi | |
| 9,047,771 B1 | 6/2015 | Thoreen et al. | |
| 2006/0045388 A1* | 3/2006 | Zeineh | G02B 21/365 382/312 |
| 2007/0237419 A1* | 10/2007 | Shechtman | G06K 9/00335 382/278 |
| 2011/0074926 A1* | 3/2011 | Khan | H04N 13/0207 348/46 |
| 2013/0110323 A1 | 5/2013 | Knight | |
| 2014/0142338 A1 | 5/2014 | Johnson | |
| 2014/0142838 A1 | 5/2014 | Durand | |
| 2015/0206438 A1 | 7/2015 | Marsden et al. | |
| 2015/0329217 A1 | 11/2015 | Kirk et al. | |
| 2016/0239585 A1* | 8/2016 | Leppanen | G01S 5/0263 |
| 2016/0277650 A1* | 9/2016 | Nagaraja | H04N 5/217 |
| 2017/0026577 A1* | 1/2017 | You | G06F 3/167 |

OTHER PUBLICATIONS

Intersections of Rays and Triangles (3D), http://geomalgorithms.com/a06-_intersect-2.html.
Structure From Motion From Two Views, http://www.mathworks.com/help/vision/examples/structure-from-motion.html.
Depth Estimation From Stereo Video, http://www.mathworks.com/help/vision/examples/depth-estimation-from-stereo-video.html.
Canadian Office Action dated Jun. 26, 2020 in Canadian Patent Application No. 2,975,139 (Canadian counterpart of the instant U.S. patent application).
Office Action dated Feb. 24, 2021, in Canadian Patent Application No. 2,975,139 (Canadian counterpart of the instant U.S. patent application).
Extended European Search Report dated Feb. 18, 2018 in European Patent Application No. 17190607.6 (European counterpart of the instant U.S. patent application).
European Examination Report dated Sep. 7, 2020 in European Patent Application No. 17190607.6 (European counterpart of the instant U.S. patent application).

* cited by examiner

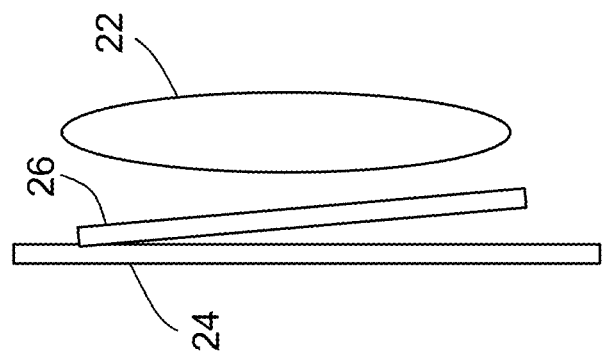
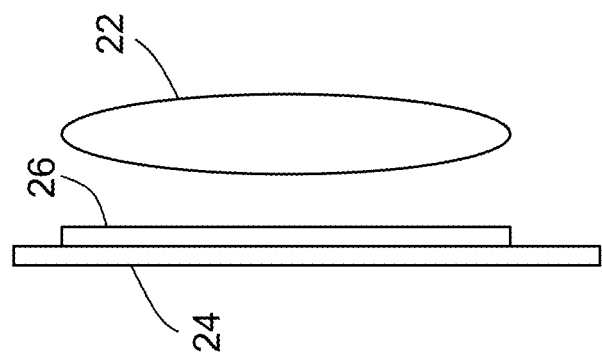

STEREO CAMERA SYSTEM FOR COLLISION AVOIDANCE DURING AIRCRAFT SURFACE OPERATIONS

BACKGROUND

This disclosure generally relates to systems and methods for avoiding collisions during ground maneuvering by an aircraft.

In the aviation industry today, the number of dollars lost to damage due to ground collision is significant. Most ground collisions occur on taxiways and gate exit/entry areas within an airport. Collision avoidance systems are becoming commonplace in the automotive industry, but have just starting to be investigated for aircraft. There are two possible approaches: via a fixed installation at each airport or as sensors on board each aircraft. The egocentric (aircraft-based) approach to obstacle detection has important advantages because it does not rely on ground control or ground installations, it does not need the vigilance of others or investment costs at each airport being used, and it does not need external data and equipage.

Many aircraft today have an external camera system that is designed to aid the pilot in ground maneuvering operations. There are two primary functions for this type of system: help the pilot maintain the gear of the aircraft on the pavement and obstacle collision avoidance. An external camera system may show views of the wingtips, which allows pilots to monitor the position of each wingtip relative to obstacles within close proximity to mitigate wingtip collisions in either folded or extended positions. However, there may be a problem of perspective depending on where the camera is situated. More specifically, if a camera is installed on the empennage section of the aircraft and shows views of the wingtip, a significant off-axis distance exists between the two and makes it very difficult to judge the position of the wingtip relative to the ground or any obstacles in the vicinity of the wingtip.

In accordance with one known ground maneuvering camera system, a plurality of video cameras are mounted on an aircraft pointing in a forward direction. More specifically, a known ground maneuvering camera system comprises: (a) a first video camera mounted to the underside of the fuselage at a position behind the nose landing gear and in front of a line that extends between the left and right wing main landing gears; (b) a second video camera mounted to the leading edge of the vertical stabilizer of the aircraft at a position located substantially on the centerline of the fuselage; and (c) third and fourth video cameras respectively mounted on the left and right sides of the vertical stabilizer or on the leading edges of the left and right portions of the horizontal stabilizer. This ground maneuvering camera system does not rely on stereoscopy. Also, some of the cameras cannot see each other and are not rigidly connected to each other. For example, cameras mounted on wings or horizontal stabilizers may move relative to cameras attached to the fuselage or vertical stabilizer due to flexure of wings or horizontal stabilizers which are secured at one end only.

For a camera-based surface operations collision avoidance system on commercial and military jet aircraft, at least two cameras are needed to provide reliable three-dimensional (3-D) tracking of objects. Due to the cost of mounting cameras on an aircraft (retrofit installation costs are very high), a minimal camera system that can see as much as possible of the forward and side views of objects around the aircraft during taxi is desired.

SUMMARY

The subject matter disclosed in detail below is a collision avoidance system on board an aircraft comprising sensors, a machine vision processing unit, and a system to inform the pilots of a potential collision. In accordance with one embodiment, the sensors comprise a pair of cameras mounted to a vertical stabilizer of the aircraft with a separation distance and the machine vision processing unit is configured to process the image data captured by the cameras using stereoscopic and structure from motion (SFM) techniques to detect an obstacle that is near or in the path of the aircraft. As used hereinafter, the term "camera" means a video camera.

Camera systems have the advantage that they are completely passive, thus eliminating concerns of interference or the need for operating licensing at particular airports. For a camera-based collision avoidance system, at least two cameras are needed to provide 3-D tracking of objects using stereoscopic techniques. Two cameras mounted with a large vertical separation and very wide angle lenses are preferred for collision detection during taxi. These cameras can be either visible cameras, infrared cameras or some combination that would allow day or day and night operation.

Stereoscopic techniques require two views of each potentially colliding object that needs ranging. Every object of interest has a slightly different location in each camera's view. This disparity is directly proportional to range. Thus when each frame of video is processed, the range rate of each object to each point on the aircraft can also be estimated based on the change in range across one or more frames together with the given frame rate of the cameras, the known geometry of the aircraft and the installation position of the cameras. With the range and range rate, a time to collision can be estimated toward every point of the aircraft. Thus the time to collision can be estimated and a pilot warning can be sounded (hereinafter "aural cue") based on the nearness of the potential collision, with more imminent collisions having louder or faster aural cues, for example. In the alternative or in addition, a graphical cue indicating the nearness of the potential collision can be displayed on a cockpit display screen.

One problem with retrofitting an aircraft with cameras mounted to the vertical stabilizer is the cost of calibration of such a system during installation. The problem occurs because mechanical mounting is not perfect and so the camera's relative position and center viewing angle can vary depending on slight mounting differences. This can lead to large errors when estimating range using stereoscopy and SFM methods. Another problem is that mechanical flexure over time can lead to miscalibration and incorrect ranges. General stereo calibration in the machine vision field typically uses a checkerboard or other feature-rich designed images with fixed features that must be matched between the cameras. This is labor and time intensive if it is done at each aircraft installation and thus increases the cost of such a system. The system disclosed in detail below solves this problem by creating a method of power-on self-calibration using existing feature points on the "top view" of the aircraft to adjust stored camera stereo calibration matrices used in stereoscopic and SFM algorithms.

In accordance with one embodiment, the tail cameras are rigidly mounted so that their relative positions and orientations will not change or change very little over long periods of time. Also, almost the entire visible region ahead of the aircraft's path is available to both cameras (with the exception of directly in front of the flight deck, where the pilots have full visibility). Therefore a surface operations system using self-calibrated tail-mounted cameras (that auto calibrate during power-on) has clear advantages in simplicity. Also, self-discovery of the identity (top or bottom) of each camera when mounted on the aircraft tail by using a marking template for the bottom camera (which can only be seen by the top camera) allows one part number for the software associated with each camera.

One aspect of the subject matter disclosed in detail below is a system for warning a pilot of a risk of collision, the system comprising: a first camera mounted at a first height to a leading edge of a vertical stabilizer of the aircraft for generating a first stream of video frames that include first image data representing an image of an object in a scene and second image data representing an image of a portion of the aircraft; a second camera mounted at a second height to the leading edge of the vertical stabilizer for generating a second stream of video frames that include third image data representing an image of the object in the scene and fourth image data representing an image of the portion of the aircraft, wherein the second height is less than the first height; a cue system on a flight deck of the aircraft capable of generating a cue; and a computer system. The computer system is programmed to perform the following operations: processing the video frames of the first and second streams to determine a range to the object and a range rate at which the range to the object is changing at a time; computing a time to collision based on at least the range and range rate; and triggering the cue system to produce a cue in response to the time to collision being less than a detection threshold. The first and second cameras are directed in a forward direction along a centerline of the aircraft with respective fields of view that are at least partially overlapping.

In accordance with some embodiments, the video frames of the first and second streams are processed using a stereoscopic technique to estimate a depth of the object and using a structure from motion technique to estimate a three-dimensional structure of the scene. In accordance with the same or other embodiments, the computer system is further programmed to: activate the first and second cameras to capture first and second images; calibrate the first and second cameras based on the first and second images; detect image data correlated to a camera template in the first image; and declare the first camera to be a top camera in response to detection of image data correlated to the camera template in the first image.

Another aspect of the subject matter disclosed in detail below is a system for warning a pilot of a risk of collision, the system comprising: a first camera mounted at a first height to a leading edge of a vertical stabilizer of the aircraft; a second camera mounted at a second height to the leading edge of the vertical stabilizer, wherein the second height is different than the first height; and a computer system programmed to: activate the first and second cameras to capture first and second images; detect image data correlated to a camera template in one of the first and second images; and declare one of the first and second cameras to be a top camera based on which one of the first and second images contained image data correlated to the camera template.

A further aspect of the subject matter disclosed in detail below is a method for warning that a risk of collision exists, the method comprising: activating a first camera mounted at a first height to a leading edge of a vertical stabilizer of an aircraft to generate a first stream of video frames that include first image data representing an image of an object in a scene and second image data representing an image of a portion of the aircraft; activating a second camera mounted at a second height to the leading edge of the vertical stabilizer to generate a second stream of video frames that include third image data representing an image of the object in the scene and fourth image data representing an image of the portion of the aircraft, wherein the second height is less than the first height; processing the video frames of the first and second streams to determine a range to the object and a range rate at which the range to the object is changing at a time; computing a time to collision based on at least the range and range rate; and producing a cue in response to the time to collision being less than a detection threshold.

Yet another aspect is a method for calibrating a pair of cameras, the method comprising: activating first and second cameras mounted to a leading edge of a vertical stabilizer of an aircraft to capture first and second images; calibrating the first and second cameras based on the first and second images, detecting image data correlated to a camera template in the first image; and declaring the first camera to be a top camera in response to detection of image data in the first image that is correlated to the camera template.

Other aspects of stereo camera systems for collision avoidance during aircraft surface operations are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects.

FIGS. 6A and 6B are diagrams which respectively show a camera lens and an image sensor arranged in parallel (FIG. 6A) so that no tangential distortion is produced and not in parallel (FIG. 6B) to an extent that tangential distortion occurs.

Reference will hereinafter be made to the drawings in which similar elements in different drawings bear the same reference numerals.

DETAILED DESCRIPTION

Various embodiments of an onboard collision avoidance system for aiding a pilot during ground maneuvering of an aircraft will now be described in detail for purposes of illustration only. However, it should be appreciated that the onboard collision avoidance system disclosed herein is not limited in its application to aircraft only, but may also be installed in and on other types of vehicles provided that such vehicle has a structure that allows a pair of relatively vertically displaced cameras to be mounted pointing in the forward direction.

Each embodiment disclosed herein comprises sensors, a machine vision processing unit, and a system for informing the pilot of a potential collision. In accordance with one embodiment, the sensors comprise a pair of cameras mounted (i.e., spaced apart by a separation distance) to a vertical stabilizer of the aircraft and the machine vision processing unit is configured to process the image data captured by the cameras using stereoscopic and SFM techniques to detect any obstacle that is near or in the intended path of the aircraft. Two cameras mounted with a large vertical separation and very wide angle lenses are preferred for collision detection during taxi. These cameras can be either visible cameras, infrared cameras or some combination that would allow day or day and night operation.

Figure 1A:
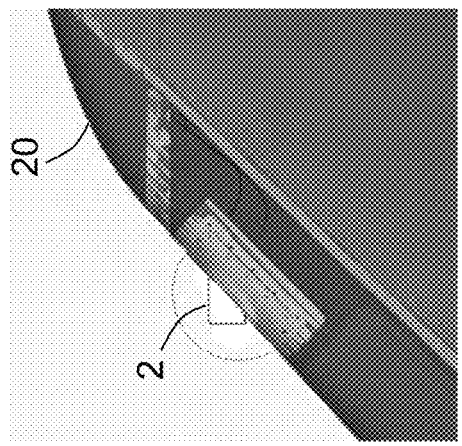
FIG. 1A is a diagram showing a side view on a magnified scale of the portion of the aircraft seen in the dashed rectangle labeled 1A in FIG. 1.
Figure 1:
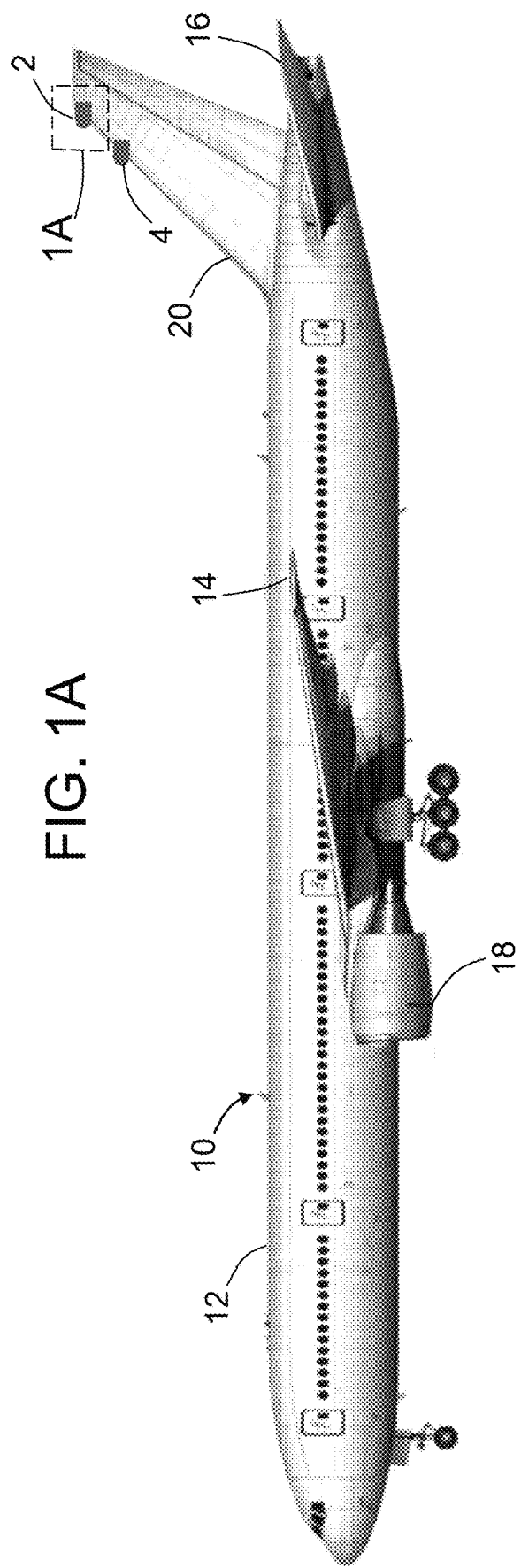
FIG. 1 is a diagram showing a side view of an aircraft having two cameras mounted on a leading edge of a vertical stabilizer in accordance with an example implementation.

FIG. 1 is a diagram showing an aircraft 10 comprising a fuselage 12, a pair of wings (only one wing 14 is visible), a horizontal stabilizer 16, a pair of engines (only one engine 18 is visible) and a vertical stabilizer 20. A top camera 2 and a bottom camera 4 are mounted on the leading edge of the vertical stabilizer 20, both cameras pointing in a forward direction along a centerline of the aircraft with at least partially overlapping fields of view.

FIG. 1A shows a side view on a magnified scale of the portion of the aircraft seen in the dashed rectangle labeled 1A in FIG. 1, which portion includes the top camera 2. In accordance with one simulated configuration, the top camera 2 and bottom camera 4 were separated by a distance of 10 feet, each camera being a 640 by 480-pixel camera with a 90 by 67.5-degree field of view (FOV). In an actual implementation, the position and orientation of top camera 2 and bottom camera 4 are adjusted that the bottom camera is in the field of view of the top camera, but the top camera is not in the field of view of the bottom camera. Various known mountings for these cameras can be employed and are not described in detail herein. As will be readily appreciated by those skilled in camera systems, various types of cameras may be used, for example, low-light or infrared/thermal cameras could be used for night operations.

The aircraft 10 may be moving along a path (e.g., on a runway). An object (not shown in FIG. 1) may be moving along the same or a different (e.g., intersecting) path. Depending upon the relative positions and/or relative movements of the aircraft 10 and/or the object, a risk may exist that the object and the aircraft 10 will collide. The collision avoidance system disclosed herein may be installed on an aircraft of a type different than the type depicted in FIG. 1. For example, the aircraft may be a commercial passenger aircraft operated by an airline, a cargo aircraft operated by a private or public entity, a military aircraft operated by a military or other government organization, a personal aircraft operated by an individual, or any other type of aircraft operated by any other aircraft operator. The object may be another aircraft on the ground or any ground vehicle of a type typically found at an airport.

The top camera 2 and bottom camera 4 are configured to capture image data representing images in the respective fields of view of the cameras. In an example implementation, each of top camera 2 and bottom camera 4 may comprise a wide-FOV camera (i.e., greater than 90 degrees). The two cameras may be of the same type or different types. In alternative embodiments, the camera system may include one or more additional cameras.

The top camera 2 and bottom camera 4 may operate over any range or ranges of wavelengths to capture images. For example and without limitation, the top camera 2 and bottom camera 4 may be configured to obtain images in any one or more of the infrared, near-infrared, visible, and ultraviolet wavelength ranges. The cameras may be configured to capture images by detecting polarized light.

In an example implementation, the top camera 2 and bottom camera 4 each capture video images comprising a series of successive digital video image frames captured at a rapid rate (e.g., 30 Hz) over a period of time. The images captured by the top camera 2 and bottom camera 4 are processed using stereoscopic and SFM techniques to detect the presence of one or more objects. Optionally, the images can also be used to identify one or more characteristics of any detected objects using object recognition technology.

In accordance with one embodiment, the top camera 2 and bottom camera 4 are mounted on the vertical stabilizer 20 of the aircraft 10 looking forward and having a wide-angle field of view. For example, the lateral angle of the field of view is preferably greater than the vertical angle of the field of view. The respective fields of view of the two cameras are at least partially and preferably substantially entirely overlapping.

Figure 2:
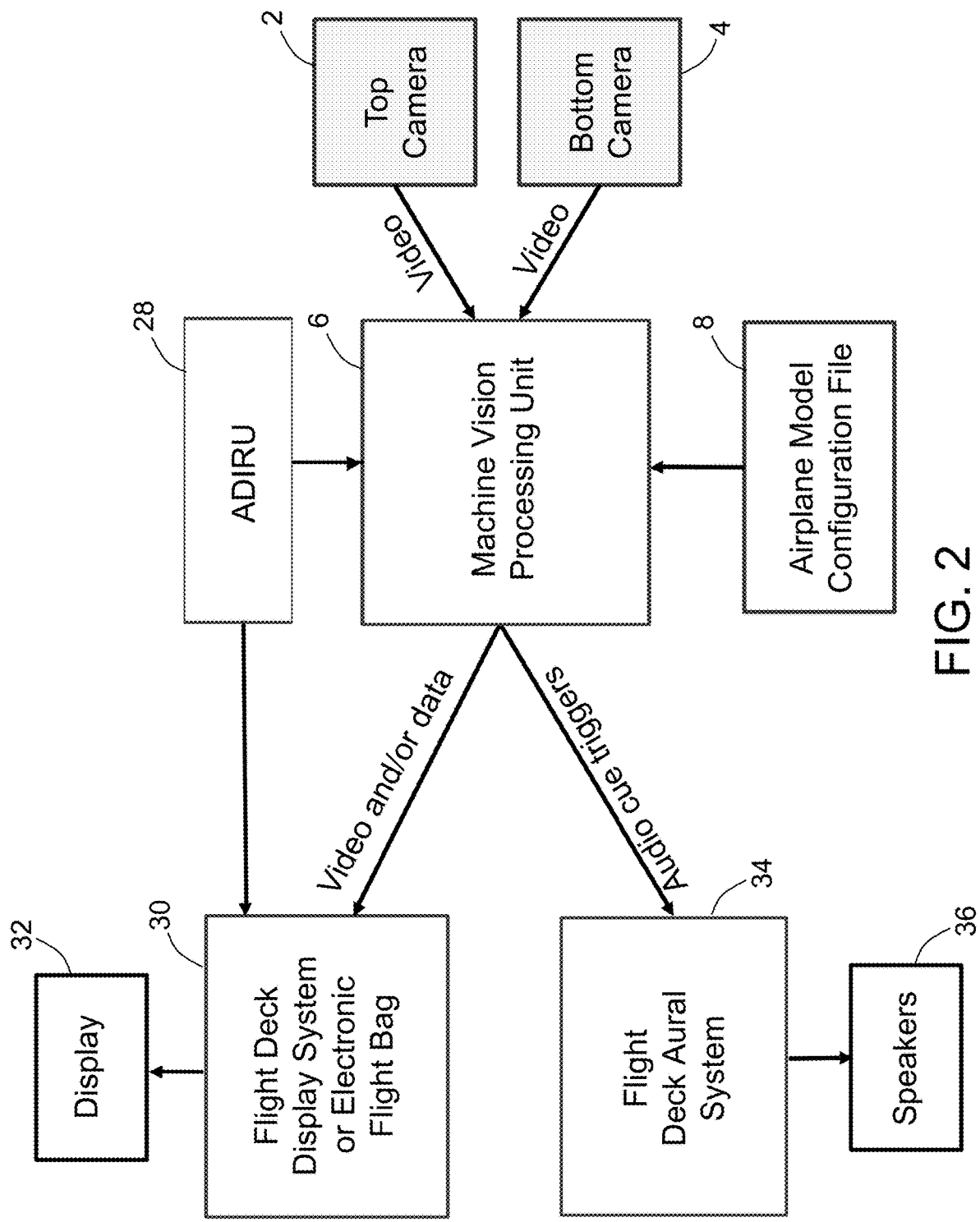
FIG. 2 is a block diagram identifying components of an object detection and collision avoidance system situated on board the aircraft depicted in FIG. 1, which system comprises the top and bottom cameras mounted to a vertical stabilizer of an aircraft and a machine vision processing unit configured to process acquired image data using stereoscopic and SFM techniques.

The object detection and collision avoidance system further comprises the additional components identified in FIG. 2, including a machine vision processing unit 6 that is located inside the aircraft fuselage, but is communicatively coupled to the top camera 2 and bottom camera 4 so that image data in the form of respective streams of video frames is received from those cameras. The machine vision processing unit 6 can be configured to recover three-dimensional shape and color information from captured images of objects using any one of a number of methods known in the art.

In accordance with one embodiment, the machine vision processing unit 6 comprises a computer system that executes software configured to process the received image data using stereoscopic and SFM frame processing algorithms to determine whether any object in proximity poses a risk of collision. The stereoscopic technique establishes correspondence of points or lines between the two images captured by the two cameras and estimates, from the positions of the cameras and pairs of corresponding points or lines on the right and left images, the positions of points and lines on a scene space corresponding to the pairs of corresponding points or lines. The SFM technique tracks individual feature points on a number of images picked up by a moving camera and estimates the positions of points on a scene space corresponding to the feature points.

In addition, the software executed by the machine vision processing unit 6 is configured to calculate a range to each potentially colliding object that appears in the field of view of both cameras based on the image data in respective video frames concurrently acquired by those cameras and further based on aircraft geometry data retrieved from an airplane model configuration file 8 and aircraft state data (e.g. groundspeed, heading) received from an air data inertial reference unit (ADIRU) 28. The airplane model configuration file 8 contains information about the specific aircraft model (such as braking capabilities and aircraft dimensions) that is needed for determining if/when indications need to be raised in the flight deck. The aircraft dimensions describe the size and shape of the whole exterior of the aircraft.

The machine vision processing unit 6 executes instructions stored in a non-transitory tangible computer-readable storage medium (not shown in FIG. 2) such as an internal data storage unit, an external data storage unit, or a combination thereof. The machine vision processing unit 6 may comprise any one of various types of data processing technology. For example, the machine vision processing unit 6 may comprise a dedicated-purpose electronic processor or a general-purpose computer. Other types of processors and processing unit technologies are possible. Likewise the non-transitory tangible computer-readable storage medium may comprise any one of various types of data storage technology. For examples, the non-transitory tangible computer-readable storage medium may comprise random access memory, read only memory, solid state memory, or any combination thereof. Other types of memories and data storage unit technologies are possible.

The collision avoidance system disclosed herein records an imaged scene from two different perspective viewpoints using the top camera 2 and bottom camera 4 seen in FIG. 1. The time-synchronized pairs of image sequences provided by these cameras implicitly contain the scene's depth information. The machine vision processing unit 6 uses stereoscopic and SFM frame (i.e., image) processing to extract that depth information.

In accordance with one implementation, the machine vision processing unit 6 comprises a computer system that executes software configured to process successive pairs of views (i.e., video frames) for each potentially colliding object that needs ranging. Every object of interest has a slightly different location in each camera's view. This disparity is directly proportional to range. During processing of successive video frames, the range rate of each object to each point on the aircraft can also be estimated based on the change in range across one or more video frames together with the given frame rate of the cameras, the known geometry of the aircraft and the installation position of the cameras. With the range and range rate, a time to collision toward every point of the aircraft can be calculated by the machine vision processing unit 6. Thus the time to collision can be estimated and compared to pre-stored detection thresholds. When a detection threshold is surpassed, an aural cue trigger signal is sent to a flight deck aural system 34, which is thereby activated to sound a cue through speakers 36. The particular aural cue sounded is a function of the degree of proximity of the object or the nearness of a potential collision. In accordance with one implementation, as the time to collision decreases, respective detection thresholds are surpassed which trigger respective aural indicators representing respective risk levels. For example, a pilot warning can be sounded based on the nearness of the potential collision, with more imminent collisions having louder (i.e., greater volume or amplitude) or faster (i.e., greater repetition rate) aural cues.

Still referring to FIG. 2, the machine vision processing unit 6 also records the two perspective viewpoints from the cameras and combines them to provide a stereoscopic image sequence, which is sent to a flight deck display system or electronic flight bag 30 and then displayed on a cockpit display 32 for viewing by the pilot. In addition, the machine vision processing unit 6 sends time-to-collision data to flight deck display system or electronic flight bag 30 for display on cockpit display 32.

Figure 3:
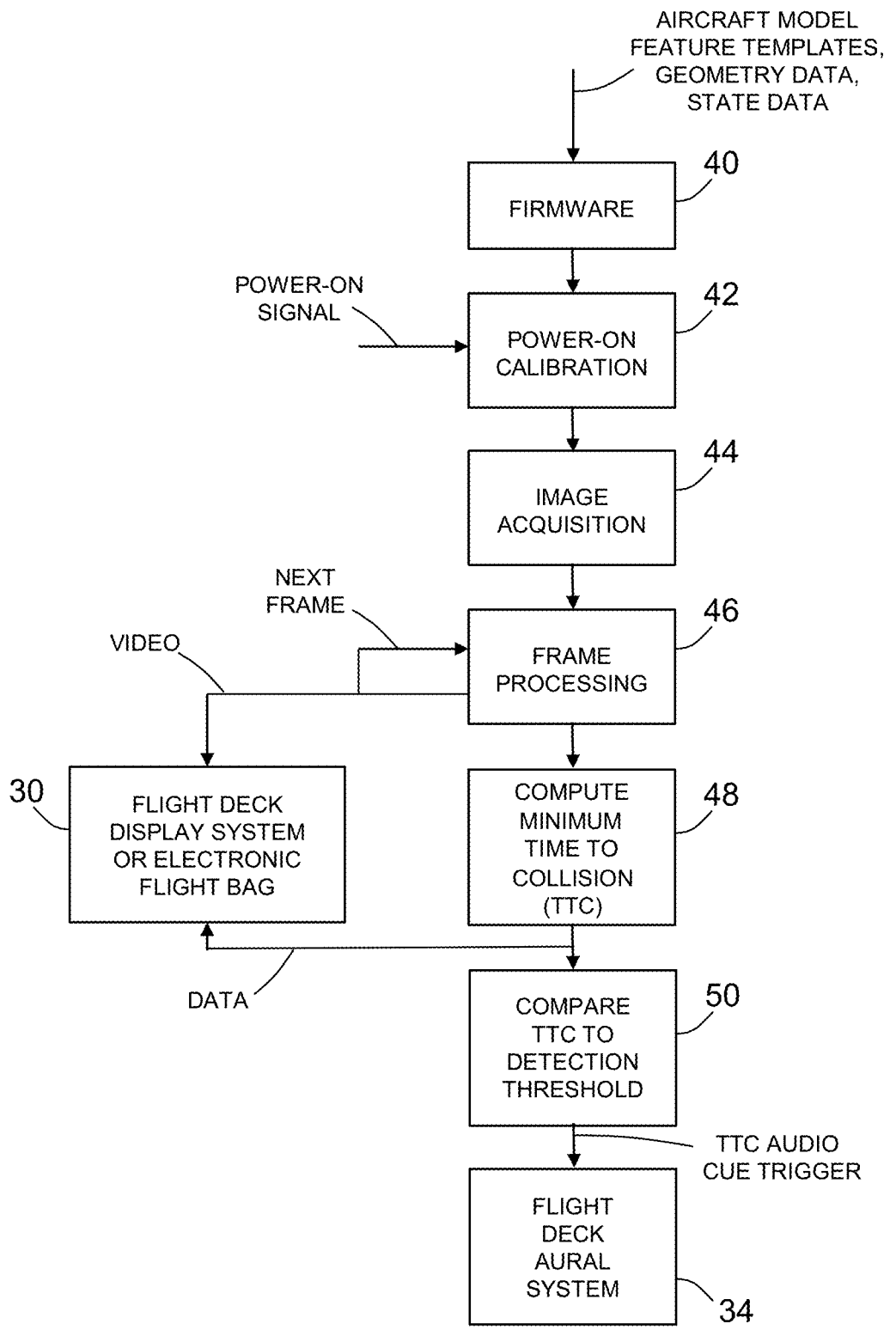
FIG. 3 is a flowchart identifying steps of a method for sounding a cue on the flight deck based on the degree of proximity of a potentially colliding object to an aircraft on a runway.

FIG. 3 is a flowchart identifying steps of a method for sounding a cue on the flight deck based on the degree of proximity of a potentially colliding object to an aircraft on a runway. The machine vision processing unit 6 (see FIG. 2) comprises firmware 40 held in a non-volatile memory device such as read only memory, erasable programmable read-only memory, or flash memory. In accordance with one embodiment, the input to firmware 40 includes aircraft model feature templates, which contain picture templates and information about the markings and equipment visible on the top of the aircraft for registration/calibration of the cameras. Possible calibration features on an aircraft model include pitot tubes, antennas, top centers of windows, roof features, front and back edges of wing tips, the bottom of the vertical stabilizer and the bottom camera. The input to firmware 40 also includes aircraft geometry data and aircraft state data. The aircraft geometry data includes an overall exterior geometric model of the aircraft for use in processing the basic time-to-collision calculations, as well as a defined region of interest around the aircraft where collision events should be considered for detection. The aircraft state data includes data taken from the airplane model configuration file 8 (see FIG. 2), which contains information about the specific aircraft model that is needed for determining if/when indications need to be raised in the flight deck (information such as braking capabilities and aircraft dimensions). The aircraft state data may also comprise weather data and data representing airport conditions (wet/dry pavement, special airport considerations, etc.). A fourth piece of data used only by the time-to-collision processing (described in detail below) is a set of safe object image models used to eliminate objects on the scene for which collision avoidance should not be processed. These include objects such as humans walking through the scene, passenger ramps, fuel trucks, baggage carts, etc. Such expected objects should not cause extraneous cues to be generated.

After the firmware 40 has been loaded, the system is ready to be calibrated. The machine vision processing unit 6 is configured to perform a calibration process 42 for each camera in response to receipt of a signal indicating that the aircraft's electrical power has been turned on. After calibrating both cameras, the object detection and collision avoidance system is ready for use during aircraft surface operations. The top and bottom cameras acquire successive images in the form of video frames while the aircraft is on the ground (step 44). Those video frames are then processed using known stereoscopic and SFM techniques (step 46). For example, respective images of an object in paired video frames are detected, segmented and associated in a known manner and stereoscopic disparities are measured. The processed video frames are sent to the flight deck display system or electronic flight bag 30 (see FIG. 2) and then displayed on the cockpit display 32 for viewing by the pilot. In addition, the disparity measurements are used to compute the minimum time to collision (TTC) (step 48) based on computed ranges and range rates. The resulting time-to-collision data is sent to the flight deck display system or electronic flight bag 30 for display on cockpit display 32. The time-to-collision data is also sent to a comparator that compares the minimum time to collision with one or more detection thresholds (step 50). If the comparator determines that a detection threshold has been surpassed, then a TTC aural cue signal is sent to the flight deck aural system 34 (see FIG. 2), which is thereby activated to sound an appropriate cue. For example, the time to collision can be estimated and an aural cue can be generated based on the nearness of the potential collision, with more imminent collisions having louder or faster aural cues. In the alternative or in addition, a graphical cue indicating the nearness of the potential collision can be displayed on the cockpit display 32.

Figure 4:
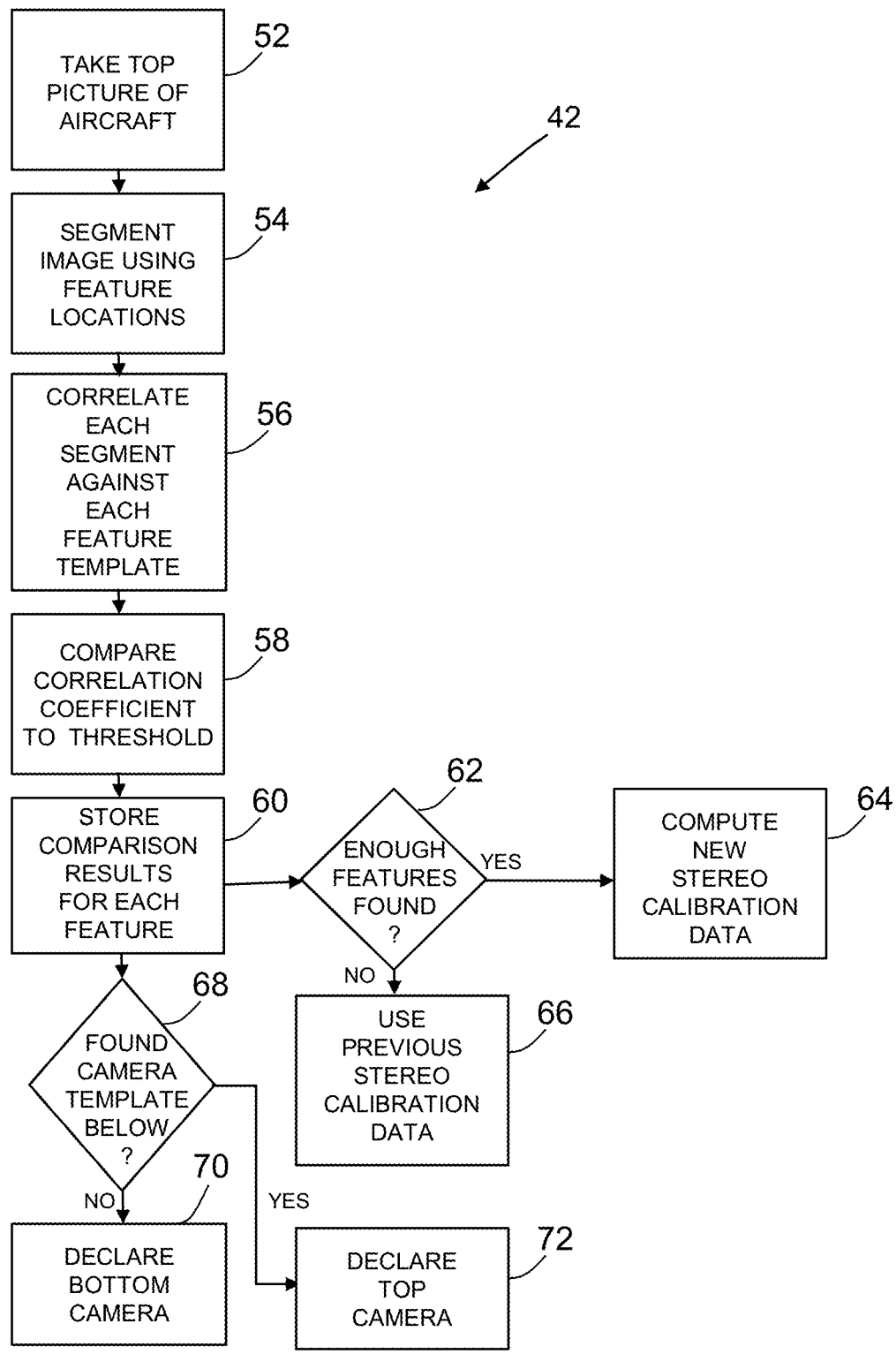
FIG. 4 is a flowchart identifying steps of a power-on calibration algorithm for use in calibrating top and bottom cameras mounted to a vertical stabilizer of an aircraft.

The power-on self-calibration process 42 uses templates and correlation to locate each feature point, as well as the special feature template corresponding to the bottom camera 4 in view below the top camera 2. FIG. 4 is a flowchart identifying steps of a power-on calibration algorithm performed by the machine vision processing unit 6 in accordance with one embodiment. This algorithm is used to calibrate the top and bottom cameras relative to the aircraft frame of reference. During the calibration process, the machine vision processing unit 6 (or a separate computer in communication therewith or separate processors incorporated in the cameras) activates both cameras to take pictures of the top of the aircraft in response to receipt of a power-on signal (step 52). The machine vision processing unit 6 (see FIG. 2) segments the portions of the aircraft appearing in both images using feature locations with sizes appropriate for the image templates of each feature (step 54). Then each feature segment is correlated against its template image and a maximum correlation coefficient is computed together with an offset from the original feature location (step 56). The maximum correlation coefficient is compared against a correlation coefficient threshold, and if above the correlation coefficient threshold, the correlation is considered good (step 58). The comparison results for each feature are stored (step 60). A determination is then made whether a sufficient number of good correlations have been established or not (step 62). If not enough feature correlations are good, then previous stereo calibration data in the form of an essential matrix is used (step 66). [In computer vision, the essential matrix is a 3×3 matrix (described in more detail below), with some additional properties called internal constraints, which relates corresponding points in stereo images assuming that the cameras satisfy the pinhole camera model.] If enough feature correlations are good, then all good correlation offset values are used to re-compute the essential matrix (step 64). After the comparison results for each feature have been stored (step 60), a determination is made whether a bottom camera template can be found in the image being processed or not (step 68). If the correlation between an imaged feature and the bottom camera template is good, the present camera being calibrated is declared to be the top camera 2 (step 72). Otherwise the present camera being calibrated is declared to be the bottom camera 4 (step 70).

In accordance with one embodiment, the top camera 2 and bottom camera 4 are calibrated using estimated camera parameters. Estimating single camera parameters requires estimates for the intrinsic and extrinsic parameters and the distortion coefficients of a single camera. These estimates can be done depending on the camera/lens combination and would be the same for all camera installations. These can be done offline using standard methods, but modified for a wide-angle or fish eye lens to better model the lens distortion. In the case of a camera pair used for stereoscopic imaging, the two cameras need to be calibrated relative to the aircraft frame of reference in order to provide for a forward-looking stereo collision avoidance system.

To model the camera intrinsics, the calibration algorithm assumes a linear camera model to correctly model the camera frame of reference to pixel mapping. The purpose is to remove distortions of external object image locations so that disparity measurement and structure from motion techniques can be used to process the entire field of view accurately. Using an accurate camera calibration will ensure the range and range rate of external objects can then be accurately estimated across the entire field of view of the camera pair.

Specifically, the linear model for a single camera is as follows:

$$w[x\ y\ 1] = [X\ Y\ Z\ 1]\begin{bmatrix}R\\T\end{bmatrix}K$$

where (X,Y,Z) are the world coordinates of a point; (x,y) are coordinates of the corresponding image point; w is a scale factor relating normalized pixel distance to world distance; K is a 3×3 camera intrinsic matrix; R is a 3×3 matrix representing the 3-D rotation of the camera; and T is a 1×3 translation of the camera relative to the world coordinate system.

The intrinsic matrix K contains five intrinsic parameters as shown below:

$$K\begin{bmatrix}\alpha_x & \gamma & u_0\\0 & \alpha_y & v_0\\0 & 0 & 1\end{bmatrix}$$

These parameters encompass the focal length, image sensor format, and principal point. The parameters $\alpha_x = f \cdot m_x$ and $\alpha_y = f \cdot m_y$ represent focal length in terms of pixels, where $m_x$ and $m_y$ are the scale factors relating pixels to distance and f is the focal length in terms of distance. Also, $\gamma$ represents the skew coefficient between the x and y axes, and $u_0$ and $v_0$ represent the principal point, which ideally would be in the center of the image.

The above linear model must be adjusted using additional non-linear factors to account for radial (lens) distortion and tangential distortion. These are often defined by polynomial models and are used to adjust the undistorted image point pixels into distorted image point pixels (or vice versa). Non-linear optimization techniques are sometimes used to find these polynomial parameters.

Figure 5B:
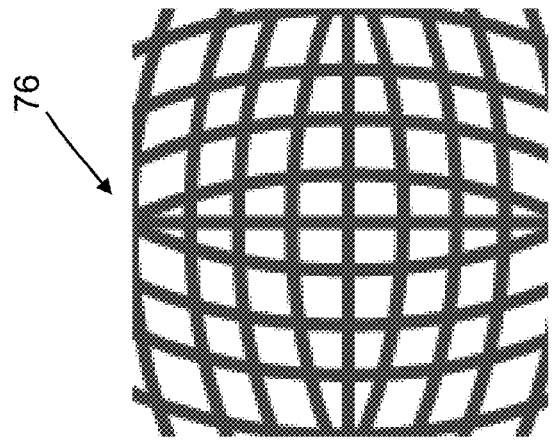
FIGS. 5A through 5C are diagrams that respectively show a distortion-free lens effect (FIG. 5A), a positive radial "barrel" distortion effect (FIG. 5B) and a negative radial "pincushion" distortion effect (FIG. 5C).
Figure 5A:
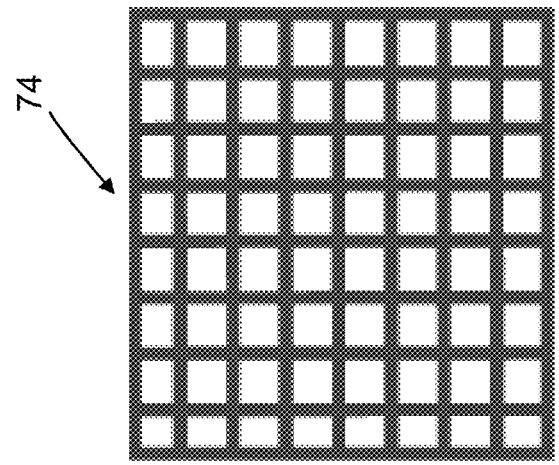
Figure 5C:
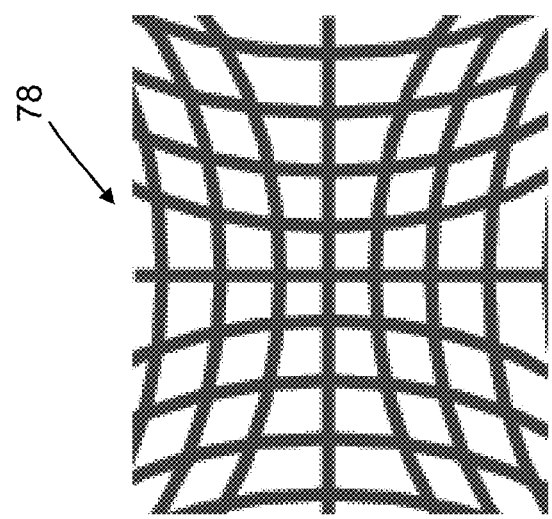

For radial (lens) distortion, images of a standard pattern such as a checker board or fractal pattern are taken at multiple angles and distances and across the field of view of the camera or camera pair. Then the transform which flattens the feature points across the pixel space of the cameras is estimated. There are several important effects to model with the transform. FIGS. 5A through 5C are diagrams that respectively show a distortion-free lens effect 74 (FIG. 5A), a positive radial "barrel" distortion effect 76 (FIG. 5B) and a negative radial "pincushion" distortion effect 78 (FIG. 5C).

In geometric optics, distortion is a deviation from rectilinear projection, a projection in which straight lines in a scene remain straight in an image. It is a form of optical aberration. As previously disclosed, estimating single camera parameters requires estimates for the intrinsic and extrinsic parameters and the distortion coefficients of a single camera.

In accordance with one embodiment, images of a standard rectilinear pattern such as a checker board (see FIG. 5A) are taken at multiple angles and distances and across the field of view of the camera. Then a transform which flattens the feature points across the pixel space of the camera is estimated. There are several important effects to model with the transform. This transform would take out radial distortions caused by the lens. The most commonly encountered distortions are radially symmetric or nearly radially symmetric. Such radial distortions arise from the symmetry of a photographic lens. These radial distortions can usually be classified as either positive radial (i.e., barrel) distortions or negative radial (i.e., pincushion) distortions. Commonly seen on wide-angle lenses, barrel distortion happens because the field of view of the lens is much wider than the size of the image sensor and hence it needs to be "squeezed" to fit. In barrel distortion, image magnification decreases with distance from the optical axis. The apparent effect (depicted in FIG. 5B) is that of an image which has been mapped around a sphere (or barrel). In pincushion distortion, image magnification increases with the distance from the optical axis. The visible effect (depicted in FIG. 5C) is that lines that do not go through the center of the image are bowed inwards, towards the center of the image, like a pincushion.

In accordance with one embodiment disclosed herein, a transformation matrix is computed which would remove radial distortions caused by the lens that produces effects such as those depicted in FIGS. 5B and 5C. This is typically done using polynomial modeling such as with the following equations, in which the distorted points are denoted as $x_{distorted}$ and $y_{distorted}$ respectively:

$$x_{distorted} = x(1 + k_1 * r^2 + k_2 * r^4 + k_3 * r^6 + \ldots)$$

$$y_{distorted} = y(1 + k_1 * r^2 + k_2 * r^4 + k_3 * r^6 + \ldots)$$

where x and y are undistorted pixel locations; $k_1$, $k_2$ and $k_3$ are the radial distortion coefficients of the lens; and $r^2$ is the distance from the pixel array center (i.e., $r^2 = x^2 + y^2$). Severe distortion, such as occurs in wide-angle lenses, requires more coefficients to model accurately.

An additional non-linear distortion is caused by tangential distortion, which occurs when the lens and the image plane (i.e., the sensor) are not parallel. FIG. 6A shows a camera lens 4 and a camera sensor 6 which are parallel to a vertical plane 8. In contrast, FIG. 6B shows a camera lens 4 which is parallel to a vertical plane 8, while the camera sensor 6 is not parallel to the camera lens 4. The tangential distortion coefficients model the type of distortion depicted in FIG. 6B.

The distorted points are denoted as $x_{distorted}$ and $y_{distorted}$ respectively:

$$x_{distorted} = x + [2 * p_1 * x * y + p_2 * (r^2 + 2 * x^2)]$$

$$y_{distorted} = y + [p_1 * (r^2 + 2 * y^2) + 2 * p_2 * x * y]$$

where x and y are undistorted pixel locations; $p_1$ and $p_2$ are tangential distortion coefficients of the lens; and $r^2$ is the distance from the pixel array center (i.e., $r^2 = x^2 + y^2$).

Stereo camera calibration requires at least the relative position and orientation of the pair of cameras. If the cameras are separately calibrated, the relative position and orientation of the pair of cameras must be specified. Specifically, the above models would include two 3×3 rotation matrices $R_{12}$ and $R_{21}$ that relate the rotation of the first camera to the rotation of the second camera and vice versa. Also there are two 3×1 translation vectors $T_{12}$ and $T_{21}$ that relate the translation of the first camera to the translation of the second camera and vice versa. In addition, the camera pair may also have different intrinsic matrices $K_1$ and $K_2$ and different non-linear distortions as well.

As an alternative to help with stereo processing, the linear models above may be combined to relate normalized pixel locations in the two cameras using what is termed the essential matrix E, which is a 3×3 matrix that relates the two cameras so that they satisfy the following equation:

$$[x_2, y_2, 1] * E * [x_1, y_1, 1] = 0$$

where the points are expressed in normalized image coordinates. Here the origin is at the camera's optical center and the x and y pixel coordinates are normalized by the focal length $f_x$ and $f_y$. (This simple linear version does not capture the separate non-linear distortions in both cameras described above.) An essential matrix is defined as the matrix product of one rotation matrix and one skew-symmetric matrix, both 3×3. The skew-symmetric matrix must have two singular values which are equal and another which is zero. The multiplication of the rotation matrix does not change the singular values, which means that also the essential matrix has two singular values which are equal and one which is zero.

The result of the calibration process is that the machine vision processing unit 6 will be configured to identify which video sequence is coming from the top camera 2 and which video sequence is coming from the bottom camera 4. Taking this information and the offsets into account, the machine vision processing unit 6 processes the frames to determine a range to an object and a rate at which that range is changing. Frame processing takes each image pair (synchronously) from the two cameras and produces a time-to-collision metric for the flight deck system to present to the pilots in some manner (via aural or visual cues). The first step is to produce a 3-D image from at least two 2-D images using one or more 3-D processing methods such as stereoscopy and structure from motion. This step uses known image processing techniques. General information about stereoscopic processing (i.e., depth estimation from stereo video) and structure from motion processing (i.e., estimation of the 3-D structure of a scene from a set of 2-D images) can be found at the website www.mathworks.com and in Multiple View Geometry in Computer Vision, Second Edition. Richard Hartley and Andrew Zisserman, Cambridge University Press, March 2004. The second step is to compute a respective minimum time to collision (TTC) between each object in the scene and the aircraft. This parameter could be "infinite" in value if no object is predicted to collide. The flight deck collision warning software can then produce an aural or visual cue whose intensity can be based on the magnitude of the minimum TTC and only under predefined conditions (for example, only under taxi, not in flight and not stopped at the gate).

Figure 7:
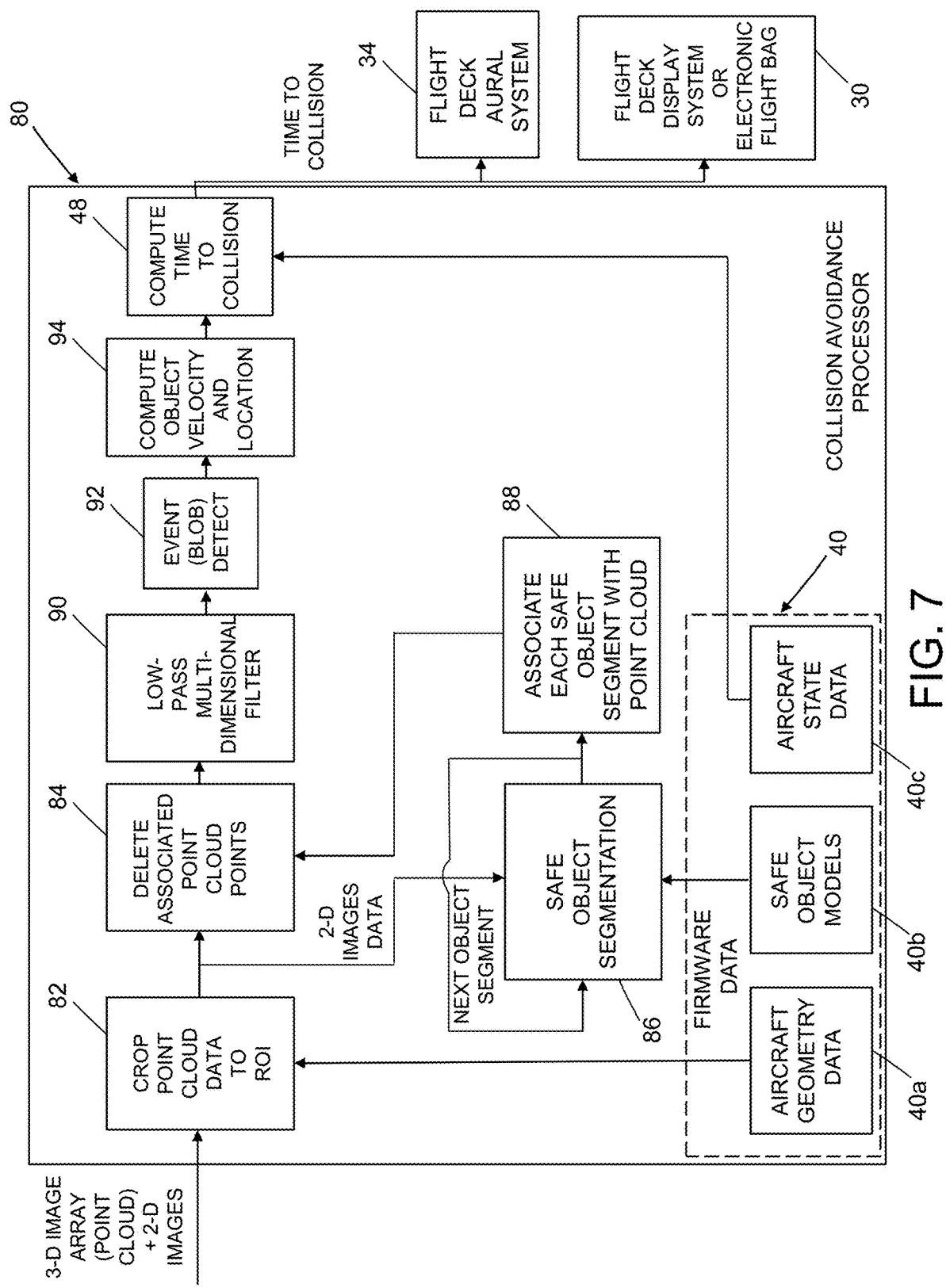
FIG. 7 is a flowchart identifying steps of a process for computing a time to collision between an object and an aircraft on the ground in accordance with one embodiment.

FIG. 7 shows a collision avoidance processor 80 programmed to compute a time to collision between an object and an aircraft on the ground. The process for computing a time to collision may be implemented by executing code of various software modules stored in a non-transitory tangible computer-readable storage medium. The collision avoidance processor 80 may comprise a multiplicity of processing units that execute code of respective software modules.

As seen in FIG. 7, the collision avoidance processor 80 receives data representing a 3-D image data from a 3-D image processing software module (not shown). That 3-D image data will be in world coordinates (X, Y, Z, R, G, B) if there are three color planes red, green and blue. This creates a point cloud in six-dimensional space. Inherently there is a pair of 2-D images that this point cloud was derived from. These are 2-D arrays in pixel coordinates with color vectors (R, G, B) for entries, or what is also seen as three 2-D arrays for red, green and blue. The time-to-collision processing comprises both point cloud (3-D) and color plane (2-D) processing. The results of the time-tocollision processing are output from the collision avoidance processor 80 to the flight aural system 34 and the flight deck display system or electronic flight bag 30. It should be noted that the step of comparing the time to collision to one or more detection thresholds can be performed in either the collision avoidance processor 80 or in a separate processor in the flight deck aural system 34. If thresholding is done in the collision avoidance processor 80, then the detection thresholds are included in the aircraft state data 40*c*.

In accordance with one embodiment, the collision avoidance processor 80 performs at least the steps identified in FIG. 7. First, the point cloud data is cropped by deleting all points in the point cloud that are outside the aircraft region of interest (ROI) (step 82). This eliminates processing of point cloud data that would result in the detection of collisions with the runway and "sky" as well as objects too far way or attached to the aircraft. This point cloud cropping function uses aircraft geometry data 40*a* in firmware 40.

Next, image data representing safe objects is segmented in the cropped 2-D image data (step 84). Safe object segmentation uses standard image segmentation processing to segment out "safe" objects represented by a set of safe object image models 40*b* loaded in firmware 40. The safe object segmentation process eliminates objects on the scene for which collision avoidance should not be processed. These include objects such as humans walking through the scene, the passenger ramp, fuel truck, baggage carts, etc. Such expected objects should not cause extraneous alarms. This produces sets of pixels for each such object. Each safe segment pixel is associated with a point in the point cloud (step 88) through a range map from stereoscopic processing. Each such safe point in the point cloud is deleted (step 84).

Thereafter, a low-pass multi-dimensional image filter 90 is applied to the point cloud. This filter is defined in a special way to handle the fact that the point cloud is sparser the farther away each point is from the cameras. Thus the filter must have a wider impulse response the farther away it is applied. A standard method is to compute $y_d = \text{conv}_d([1]_R, x_d)$, where $\text{conv}_d(\ )$ computes standard d-dimensional convolution, and $[1]_R$ denotes a d-dimensional matrix that has ones in every entry and is of size R in every dimension, where R is the range of the point $x_d$ from the origin of the point cloud space (at the center point between the two cameras).

The next stage in the process is to detect events (i.e., "blobs") that represent the presence of an object in the filtered point cloud data, which object is not a safe object (step 92). The data concerning various objects found in the images can be stored in the form of a stochastic histogram. These events correspond to histogram areas that build up over time. An event detection process monitors the accumulation of data in a stochastic histogram to detect an event. An event may be, for example, the value for a particular bin in the stochastic histogram being greater than some selected value. There are various ways to do event finding, such as using mean above mean techniques of the type disclosed in U.S. Pat. No. 9,046,593 or using barcode methods of the type disclosed in U.S. Pat. No. 9,430,688.

The collision avoidance processor 80 then computes the mean location and the velocity vector of each object corresponding to a respective blob in the current video frame (step 94). The velocity vector is computed by taking the difference between the mean locations of the object corresponding to the blob in the current video frame and the blob in the previous video frame and then dividing that difference by the frame rate.

Thereafter the collision avoidance processor 80 takes the object's mean location and computes where the object corresponding to a particular blob would intersect the aircraft geometry using aircraft state data 40*c* loaded in firmware 40 and also using the velocity vector. In mathematical terms, this simply computes the intersection of a ray or line segment with each triangle in the aircraft geometric model. One suitable method for computing the intersection of a ray or line segment with a triangle is disclosed at http://geomalgorithms.com/a06-intersect-2.html. As a result of this calculation, an amount of time is also computed to this intersection point. This amount of time is modified to reflect the fact that the object represented by the blob has a certain size and so the time is shortened by the ratio of the radius of the object over norm of velocity of the object, the result of this subtraction being the time to collision (TTC), since it accounts for estimating when the leading part of the object would collide (not the center) This TTC value can then be reported out to the flight deck systems.

It should be noted that references herein to velocity mean velocity relative to the aircraft, not absolute velocity (i.e., not relative to ground). The aircraft model can be made larger to handle issues concerning inaccuracies in velocity direction estimates.

Coded instructions to implement the detection method may be stored in a mass storage device, in a volatile memory, in a non-volatile memory, and/or on a removable non-transitory tangible computer-readable storage medium such as an optical disk for storing digital data.

The detection method may be implemented using machine-readable instructions that comprise a program for execution by a processor such as the collision avoidance processor 80 shown in FIG. 7. The program may be embodied in software stored on a non-transitory tangible computer-readable storage medium such as an optical disk, a floppy disk, a hard drive or a memory associated with the collision avoidance processor 80, but the entire program and/or parts thereof could alternatively be executed by a device embodied in firmware or dedicated hardware.

The aircraft-mounted object detection and collision avoidance system disclosed herein may be implemented by hardware, software, firmware and/or any combination of hardware, software and/or firmware. Thus, for example, the aircraft-mounted object detection and collision avoidance system could be implemented using analog or digital circuits, logic circuits, programmable processors, application-specific integrated circuits, programmable logic devices or field programmable logic devices.

Also, the mounting of the two cameras on the vertical stabilizer of an aircraft allows stereo measurements in real time. These real-time stereo measurements allow each of the two cameras to focus on an object and capture respective 2-D views. The image data can be used to compute the size of an object, the range to the object and the rate at which the range to the object is changing as both the object and the aircraft are moving.

In accordance with one embodiment, an incursion is first detected when an object enters a camera's field of view and this starts a clock for timing when to stop the aircraft before a collision occurs. Detection can occur at about the frame rate of the camera, assuming sufficient computing resources. At this point, the pilot will have some reaction time before he/she activates the brakes. The stopping distance of a large aircraft takes some time that varies depending on the pavement conditions such as dry, wet or icy.

In accordance with one implementation, top and bottom cameras are mounted to the leading edge of the vertical stabilizer of an aircraft, the cameras being separated by a distance of 10 feet. Both cameras have a 90-degree lateral field of view and are aimed along the centerline of the aircraft.

A surface operations collision avoidance system on an aircraft that locates the wide angle stereoscopic cameras on the leading edge of the vertical stabilizer has been described. These cameras can be either visible cameras, infrared cameras or some combination that would allow day or day and night operation without the licensing concerns of active systems such as radar and Ladar. These cameras could be installed in a retrofit operation to in-service aircraft. The disclosed system performs a method of power-on self-calibration using existing feature points on the "top view" of the aircraft to adjust stored camera stereo calibration matrices used in the stereoscopic algorithm at installation and during every power-on operation. Finally, by using a camera feature marking, one can use identical software for the top and bottom cameras.

While collision avoidance systems have been described with reference to various embodiments, it will be understood by those skilled in the art that various changes may be made and equivalents may be substituted for elements thereof without departing from the scope of the claims set forth hereinafter. In addition, many modifications may be made to adapt the teachings herein to a particular situation without departing from the scope of the claims.

As used in the claims, the term "computer system" should be construed broadly to encompass a system having at least one computer or processor, and which may have multiple computers or processors that process independently or that communicate through a network or bus.

The invention claimed is:

1. A system for warning a pilot of a risk of collision, the system comprising:
   a first camera mounted at a first height to a leading edge of a vertical stabilizer of an aircraft for generating a first stream of video frames that include first image data representing an image of an object in a scene and second image data representing an image of a portion of the aircraft;
   a second camera mounted at a second height to the leading edge of the vertical stabilizer for generating a second stream of video frames that include third image data representing an image of the object in the scene and fourth image data representing an image of the portion of the aircraft, wherein the second height is less than the first height;
   a cue system on a flight deck of the aircraft capable of generating a cue; and
   a computer system programmed to:
   process the video frames of the first and second streams to determine a first range to the object and a first range rate at which the range to the object is changing at a first time;
   compute a first time to collision based on at least the first range and first range rate; and
   trigger the cue system to produce a first cue in response to the first time to collision being less than a first detection threshold.

2. The system as recited in claim 1, wherein the computer system is further programmed to:
   process the video frames of the first and second streams to determine a second range to the object and a second range rate at which the range is changing at a second time that is subsequent to the first time;
   compute a second time to collision based on at least the second range and second range rate; and
   trigger the cue system to produce a second cue different than the first cue in response to the second time to collision being less than a second detection threshold, wherein the second detection threshold is less than the first detection threshold.

3. The system as recited in claim 2, wherein the first cue is a sound having a first volume and the second cue is a sound having a second volume greater than the first volume.

4. The system as recited in claim 2, wherein the first cue is a repetitive sound having a first repetition rate and the second cue is a repetitive sound having a second repetition rate greater than the first repetition rate.

5. The system as recited in claim 1, wherein the video frames of the first and second streams are processed using a stereoscopic technique to estimate a depth of the object.

6. The system as recited in claim 1, wherein the video frames of the first and second streams are processed using a structure from motion technique to estimate a three-dimensional structure of the scene.

7. The system as recited in claim 1, wherein the first and second cameras are directed in a forward direction along a centerline of the aircraft with respective fields of view that are at least partially overlapping.

8. The system as recited in claim 1, wherein the computer system is further programmed to:
   activate the first and second cameras to capture first and second images; and
   calibrate the first and second cameras based on the first and second images.

9. The system as recited in claim 8, wherein the second camera has markings which are in a field of view of the first camera and the computer system is further programmed to:
   detect image data correlated to a camera template in the first image, said camera template including image data representing the markings on the second camera; and
   declare the first camera to be a top camera in response to detection of image data correlated to the camera template in the first image.

10. The system as recited in claim 1, wherein the computer system is further programmed to:
    segment the image data in the first and second images which represents portions of the aircraft appearing in both images using feature locations with sizes appropriate for image templates of each feature;
    correlate each feature segment against its template image;
    compute a maximum correlation coefficient together with an offset from an original feature location;
    compare the maximum correlation coefficient to a correlation coefficient threshold; and
    determine an essential matrix based at least in part on the results of the comparison of the maximum correlation coefficient to the correlation coefficient threshold.

11. A system for warning a pilot of a risk of collision, the system comprising:
    a first camera mounted at a first height to a leading edge of a vertical stabilizer of an aircraft;
    a second camera mounted at a second height to the leading edge of the vertical stabilizer, wherein the second height is lower than the first height, said second camera having markings which are in a field of view of the first camera; and
    a computer system programmed to:
    activate the first and second cameras to capture first and second images respectively;
    detect image data correlated to a camera template in the first image, said camera template including image data representing the markings on the second camera; and declare the first camera to be a top camera in response to detection of the camera template in the first image.

12. A method for avoiding a collision during ground maneuvering by an aircraft using cameras and an onboard computer system operably coupled to the cameras and configured to capture and process image frames from the cameras, the method comprising:
maneuvering an aircraft on the ground;
activating a first camera mounted at a first height to a leading edge of a vertical stabilizer of the aircraft to generate a first stream of video frames during the maneuvering that include first image data representing an image of an object in a scene and second image data representing an image of a portion of the aircraft;
activating a second camera mounted at a second height to the leading edge of the vertical stabilizer to generate a second stream of video frames during the maneuvering that include third image data representing an image of the object in the scene and fourth image data representing an image of the portion of the aircraft, wherein the second height is less than the first height;
using the computer system to process the video frames of the first and second streams to determine a first range to the object and a first range rate at which the range to the object is changing at a first time;
using the computer system to compute a first time to collision based on at least the first range and first range rate;
producing a first cue in response to the first time to collision being less than a first detection threshold; and
activating brakes on the aircraft in response to production of the first cue.

13. The method as recited in claim 12, further comprising:
using the computer system to process the video frames of the first and second streams to determine a second range to the object and a second range rate at which the range is changing at a second time that is subsequent to the first time;
using the computer system to compute a second time to collision based on at least the second range and second range rate; and
producing a second cue different than the first cue in response to the second time to collision being less than a second detection threshold, wherein the second detection threshold is less than the first detection threshold.

14. The method as recited in claim 13, wherein the first cue is a sound having a first volume and the second cue is a sound having a second volume greater than the first volume.

15. The method as recited in claim 13, wherein the first cue is a repetitive sound having a first repetition rate and the second cue is a repetitive sound having a second repetition rate greater than the first repetition rate.

16. The method as recited in claim 12, wherein the video frames of the first and second streams are processed using a stereoscopic technique to estimate a depth of the object.

17. The method as recited in claim 12, wherein the video frames of the first and second streams are processed using a structure from motion technique to estimate a three-dimensional structure of the scene.

18. The method as recited in claim 12, further comprising the following steps performed by the computer system:
segmenting the image data in the first and second images which represents portions of the aircraft appearing in both images using feature locations with sizes appropriate for image templates of each feature;
correlating each feature segment against its template image;
computing a maximum correlation coefficient together with an offset from an original feature location;
comparing the maximum correlation coefficient to a correlation coefficient threshold; and
determining an essential matrix based at least in part on the results of the comparison of the maximum correlation coefficient to the correlation coefficient threshold.

19. The method as recited in claim 12, further comprising:
prior to maneuvering the aircraft, activating the first and second cameras to capture first and second images; and
calibrating the first and second cameras based on the first and second images.

20. The method as recited in claim 19, wherein further comprising:
detecting image data correlated to a camera template in the first image; and
declaring the first camera to be a top camera in response to detection of image data in the first image that is correlated to the camera template.

\* \* \* \* \*